Patented Mar. 19, 1946

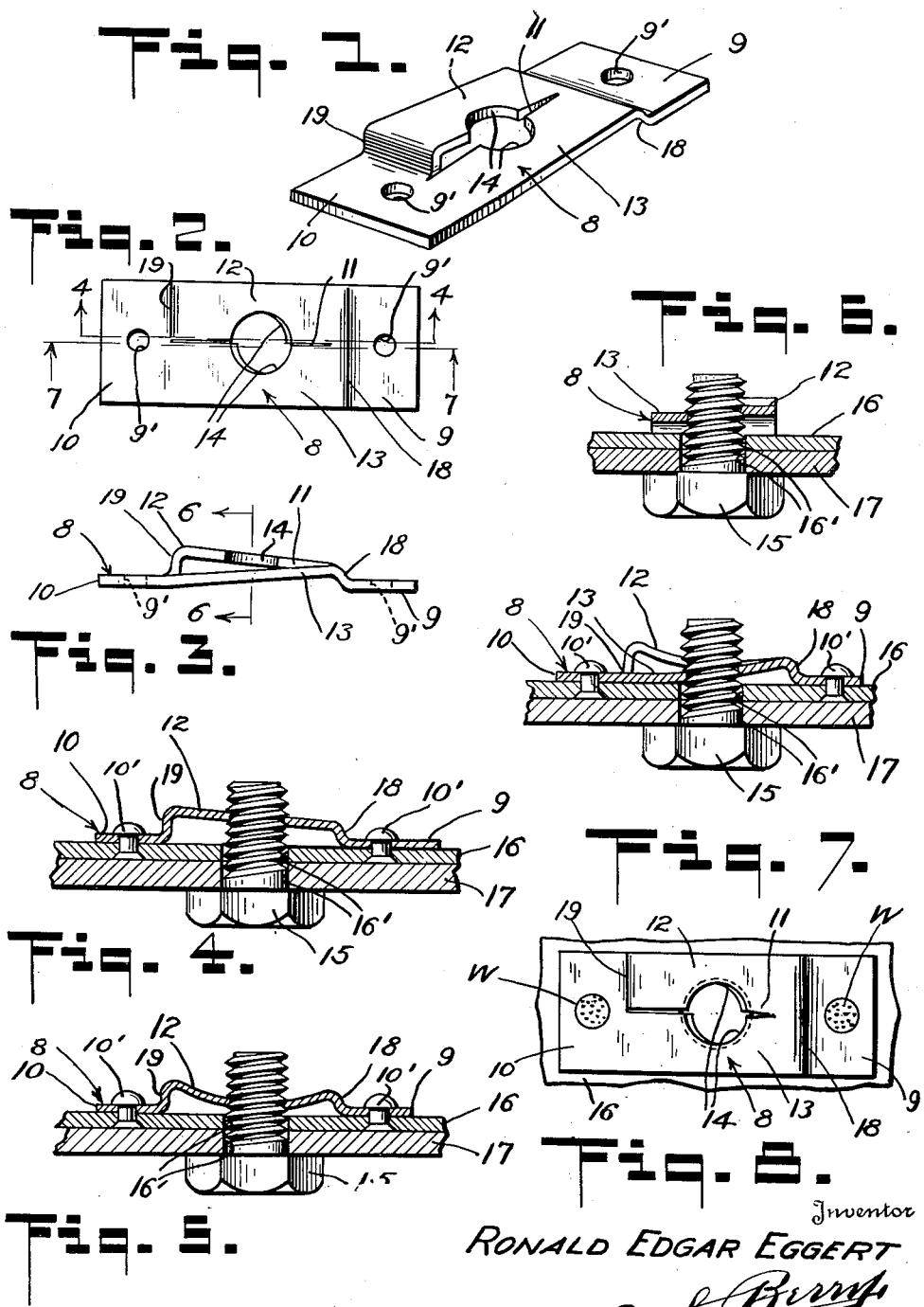

2,396,835

UNITED STATES PATENT OFFICE 2,396,835

SPRING NUT

Ronald Edgar Eggert, Burbank, Calif., assignor to Adel Precision Products Corp., a corporation of California Application December 4, 1944, Serial No. 566,507

10 Claims. (Cl. 85—36)

This invention relates to nuts of the type in which a body portion is provided with opposed resilient portions constructed and arranged so that edges thereof will have a screw threaded engagement with a bolt or screw turned therebetween, to "lock" the nut on the bolt.

An object of this invention is to provide a nut of the character above described which may be manufactured with greater ease and facility, at a lower cost and with less material than similar nuts heretofore produced, without sacrificing strength and durability and while providing for a most reliable self-locking action on the bolt or screw associated therewith.

A further object is to provide a nut such as described which is comparatively light as to weight and subject to a resilient yielding action throughout all of its area except at two seating portions at opposite ends of the nut which portions are arranged to rest on and adapted to be fixed to the object to which the nut is applied, so that the remainder of the nut in the form of resilient bridges or arches, will readily yield upon the tightening of the bolt or screw, to not only assure an effective locking action on the bolt or screw but best adapt the nut to certain installations where such "over all" resilient action is desirable.

Another object of my invention is to provide a nut of the character described in which the end portions thereof are constructed and arranged to be riveted to the member through which the bolt or like fastening is to be inserted, thereby making it unnecessary to hold the nut in place by hand in applying the bolt or like fastening, also assuring that said ends will remain seated on said member in such manner that the bridge arch portions will flex inwardly on the tightening of the bolt or like fastening and set up a spring force which urges said bridge or arch portions into tight locking engagement with the bolt or like fastening.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a spring nut embodying my invention;

Fig. 2 is a top plan view of the nut;

Fig. 3 is a side elevation of the nut;

Fig. 4 is a sectional view taken on the line 4—4 of Fig. 2, showing the nut as riveted in place but before the bolt is tightened therein;

Fig. 5 is a sectional view corresponding to Fig. 4 showing the nut as it would appear when the bolt is tightened;

Fig. 6 is a cross sectional view taken on the line 6—6 of Fig. 3 showing the nut installed but before the bolt is tightened;

Fig. 7 is a sectional view taken on the line 7—7 of Fig. 2 showing the nut installed and the bolt tightened therein;

Fig. 8 is a top plan view showing the nut as spot welded to a member to be secured.

Referring more specifically to the drawing, it will be seen that a nut made in accordance with this invention generally comprises a substantially rectangular body portion 9 of resilient sheet metal formed with bearing or seat portions 9 and 10 at its ends and having the remainder thereof outwardly offset from said ends and divided by a slit 11 to form laterally juxtaposed resilient arch or bridge portions 12 and 13. These bridge portions have complementary arcuate side edge portions 14 formed by notching or recessing opposed side edges thereof, which edge portions define a bolt receiving opening in the nut and are adapted to have a resilient screw threaded engagement with a bolt 15 applied as shown in Figs. 4 to 7 inclusive to hold members 16 and 17 together.

In forming the nut hereof the body portion 8 is given an outward bend 18 which extends transversely across the full width of the body portion at a point spaced inwardly from one edge thereof, thereby defining the bearing or seat portion 9 which latter is rectangular and takes up, as here shown, but a small part of the area of the nut, although it is obvious that these proportions may be somewhat varied if desired.

A similar outward bend 19 of greater outward and lesser transverse extent than the bend 18 is provided at a point spaced inwardly from the other end edge of the body portion approximately the same distance as the bend 18. The bend 19 extends from one side edge of the body portion to a point approximately half-way across the body portion and defines the seat or bearing portion 10 which latter is of approximately the same areas as the seat portion 9.

The seat portions or ends 9 and 10 are provided with rivet holes 9' so that they may be fixed to the member 16 by means of the rivets 10', with the opening formed by the arcuate edges 14 aligned with the bolt opening 16' in said member. This fixing of the seating ends 9 and 10 makes it unnecessary to hold the nut in place by hand and this arrangement makes the nut ideally adapted for use in confined places where hand space is not available. Moreover, this fixing of the seating portions or ends 9 and 10 assures the holding thereof against the member 16 such that the remainder of the nut will be flexed or bowed inwardly as the bolt is tightened therein.

It is now apparent that the outward bends 18 and 19 as here provided cause the remainder of the body portion between the seat portions 9 and 10 to be outwardly offset like a bridge or arch and that this offset portion will be spaced outwardly from the member 16 against which the nut is applied as shown in Figs. 4 and 5, subject to being independently flexed inwardly as indicated in Figs. 5 and 7, thereby giving the major portion of the nut considerable resilience or spring action which assures an effective locking action.

The laterally juxtaposed bridge or arch portions 12 and 13 are formed as halves of the outwardly offset portion of the body lying between the seat portions 9 and 10, the slit or cut 11 being extended along the longitudinal medial line of the body portion between the seat portions 9 and 10. It should be noted, however, that the slit, while extending from the bend 19 toward the bend 18 terminates at a point spaced inwardly of the bend 18 thereby avoiding weakening of the structure yet making possible the desired relative inclinations of the two arch or bridge portions 12 and 13.

In forming the bridge portions 12 and 13 they are stamped or pressed so as to be inclined in opposite directions, with the bridge portion 12 extended outwardly from the plane of the end or seat portions 9 and 10 a greater distance than the bridge portion 13 by reason of the bend 19 having a greater outward extent than the bend 18. This relative inclination and positioning of the portions or elements 12 and 13 is such that the arcuate edge portions 14 are disposed at the proper angles for a threaded and yielding engagement with the bolt as best shown in Figs. 1 and 6.

It will now be apparent that when the bolt is tightened, the bridge portions 12 and 13 will be bowed and flexed inwardly toward the member 16 as shown in Figs. 5 and 7 and by such action the arcuate edges 14 are caused to bite into the bolt under spring tension so as to effectively lock the nut against working loose. When the bolt is tightened as aforesaid the entire nut is flexed except the seat or bearing portions 9 and 10 which in being riveted on the member to which the nut is applied are held in such manner as to assure the aforesaid flexing action. Under extreme tightening the bridge portion 13 may, as shown in Fig. 1, lie for part of its length, against the member on which the seat portions 9 and 10 abut. This "over-all" resilient or spring action of the nut makes the nut well suited for installations where such a spring or yielding action is desired. Moreover, the riveting of the seat portions 9 and 10 makes the nut particularly well adapted for use in confined spaces where little or no room is available for holding a loose nut in place and at the same time makes it possible to obtain the desired flexing of the remainder of the nut, as it is apparent the seat portions would rock or tilt outwardly when the main body of the nut is bowed or flexed inwardly, if the seat portions were not riveted or similarly fixed on the member 16.

It will now be seen that my improved nut will afford all of the advantages of similar nuts while being considerably lighter as to weight, of smaller size, requiring less material and forming operations and yet adding resilience or spring action without sacrificing strength and durability and at the same time providing for a most reliable locking action on the bolt.

As shown in Fig. 8 the nut may be welded to the member 16 instead of riveted, in which case the ends 9 and 10 are spot welded as at W to said member.

While I have shown and described a specific embodiment of my invention I do not limit myself to the exact details of construction set forth, and the invention embraces such changes, modifications and arrangements.

I claim:

1. In a spring nut, a body portion having an outward bend extending transversely across the full width thereof at a point spaced inwardly of a margin of the body portion, a similar outward bend extending but part way across the body portion at a point spaced inwardly of the opposite margin of the body portion, the said bends providing seat portions between them and said margins and disposing the remainder of the body portion in outwardly offset relation to said seat portions; said outwardly offset portion being divided by a slit to define laterally juxtaposed arch portions having their opposed edges spaced apart for reception of a bolt or like fastening, said arch portions being oppositely inclined and arranged to dispose said edges for a screw threaded engagement with the bolt or like fastening.

2. In a spring nut, an elongated body portion having an outward bend extending transversely across the full width thereof at a point spaced inwardly of an end of the body portion, a similar outward bend extending but part way across the body portion at a point spaced inwardly of the other end of the body portion, the said bends providing seat portions at the ends of the body portion and disposing the remainder of the body portion in outwardly offset relation to said seat portions; and laterally juxtaposed elongated arch portions formed by a slit in said offset remainder of the body portion, said arch portions having opposed arcuate bolt engaging edges defining an opening for reception of a bolt or the like, said edge portions being oppositely inclined and relatively positioned for screw threaded engagement with the bolt or the like.

3. In a spring nut, a body portion having an outward bend extending transversely across the full width thereof at a point spaced inwardly of a margin of the body portion, a similar outward bend extending but part way across the body portion at a point spaced inwardly of the opposite margin of the body portion, the said bends providing seat portions between them and said margins and disposing the remainder of the body portion in outwardly offset relation to said seat portions; said outwardly offset portion being divided by a slit along its longitudinal medial line to define laterally juxtaposed arch portions having their opposed edges spaced apart for reception of a bolt or like fastening, said opposed edges being constructed and arranged to have screw threaded engagement with the bolt or like fastening.

4. In a nut, an elongated resilient body, seat portions extending across opposite ends of said body adapted to rest on the member to which the nut is applied, all of the body between said seat portions being outwardly offset from said seat portions; and laterally juxtaposed elongated resilient arch portions formed by dividing the offset portion of the body portion longitudinally, said arch portions having opposed longitudinal edges in offset relation to one another and provided with bolt engaging portions forming a bolt opening and which will have screw threaded tensioned engagement with a bolt turned therebetween, there being a slit through said offset portion of the body leading from opposite sides of the bolt opening, thereby rendering said arched portions independently yieldable in accommodation to a screw thread.

5. In a nut, an elongated body of resilient sheet metal, seat portions extending across opposite ends of said body adapted to rest on the member to which the nut is applied, all of the body between said seat portions being outwardly offset from said seat portions; and laterally juxtaposed elongated resilient bolt-engaging portions formed by dividing the offset portion of the body longitudinally, said arch portions being oppositely inclined and having edge portions between which is a bolt opening with edges adapted to have screw threaded engagement with a bolt, said seat portion having rivet holes providing for the riveting of said nut to the member to which the nut is applied, there being a slit through said offset portion of the body leading from opposite sides of the bolt opening, thereby rendering said arched portions independently yieldable in accommodation to a screw thread.

6. In a nut, an elongated body portion of resilient sheet metal, seat portions extending across opposite ends of said body portion and riveted on the member through which a bolt or the like is to be inserted for engagement with the nut, all of the body portion between said seat portions being outwardly offset from said seat portions; laterally juxtaposed elongated arch portions formed by dividing the offset portion of the body portion longitudinally, and arcuate edge portions on said arch portions forming a bolt opening, said arch portions being oppositely inclined and one of them offset a greater extent than the other, so that said arcuate edge portions are spaced apart axially of the bolt opening and angularly disposed for a threaded engagement with a bolt turned in said opening.

7. In a nut, a plate-like elongated body portion of resilient material, seat portions at opposite ends of said body portion arranged to rest against an object to which the nut is applied, laterally juxtaposed elongated portions outwardly offset from said seat portions and constituting all of the body portion lying between said seat portions, there being a slit extending between said seat portions, said offset portions extending from opposite edges of the body portion to said slit, and bolt engaging edge portions at opposite points on said outwardly offset portions, spaced apart for reception of a bolt therebetween, said offset portions being constructed and arranged so that said bolt engaging edge portions will have a tensioned screw threaded engagement with a bolt turned therebetween; said outwardly offset portions being adapted to be bowed or flexed inwardly toward the object to which the nut is applied, when the bolt is tightened in the nut, a portion of said slit being located at each side of the bolt when the nut is applied, thereby rendering said outwardly offset portions independently yieldable in accommodation to a screw thread.

8. In a nut, an elongated body portion of resilient metal, seat portions at opposite ends of said body portion arranged to rest against an object to which the nut is applied, laterally juxtaposed elongated portions outwardly offset from said seat portions, there being a slit extending between said seat portions, said offset portions extending from opposite edges of the body portion to said slit; and bolt-engaging edge portions at opposite points on said outwardly offset portions spaced apart for reception of a bolt therebetween, said offset portions being constructed and arranged so that said bolt engaging edge portions will have a tensioned screw threaded engagement with a bolt turned therebetween; said offset portions being arranged to bow or flex inwardly toward the object to which the nut is applied, when the bolt is tightened in the nut, said slit having one end terminated at the juncture of one seat portion and said offset portions, the other end of said slit being inwardly spaced from the juncture of the other seat portion and said offset portions.

9. In a spring nut, a body portion having an outward bend extending transversely across the full width thereof at a point spaced inwardly of a margin of the body portion, a similar outward bend extending but part way across the body portion at a point spaced inwardly of the opposite margin of the body portion, the said bends providing seat portions between them and said margins and disposing the remainder of the body portion in outwardly offset relation to said seat portions; said outwardly offset portion being divided by a slit along its longitudinal medial line to define laterally juxtaposed arch portions having their opposed edges spaced apart for reception of a bolt or like fastening, said arch portions being oppositely inclined and arranged to dispose said edges for a screw threaded engagement with the bolt or like fastening, said seat portions having rivet holes therein providing for the riveting thereof on the member to which the nut is applied, before the bolt is inserted through said member into the nut.

10. In a nut, an elongated resilient body, seat portions extending across opposite ends of said body adapted to rest on the member to which the nut is applied, all of the body between said seat portions being outwardly offset from said seat portions; and laterally juxtaposed elongated resilient arch portions formed by slitting the offset portion of the body portion, said arch portions having opposed longitudinal edges in offset relation to one another and provided with bolt engaging portions forming a bolt opening and which will have screw threaded tensioned engagement with a bolt turned therebetween, said seat portions being constructed so that they may be fixed to the member to which the nut is applied, prior to the insertion of the bolt through said member into said nut.

RONALD EDGAR EGGERT.